United States Patent
Collins et al.

(10) Patent No.: US 7,065,650 B2
(45) Date of Patent: Jun. 20, 2006

(54) METHOD FOR INDICATING THE INTEGRITY OF A COLLECTION OF DIGITAL OBJECTS

(75) Inventors: Michael Collins, Portland, OR (US); Edna Cahanovitc, Karme Yosef (IL); Yanki Margalit, Ramat-Gan (IL); Dany Margalit, Ramat-Gan (IL)

(73) Assignee: Aladdin Knowledge Systems Ltd., Tel Aviv (IL)

( * ) Notice: Subject to any disclaimer, the term of this patent is extended or adjusted under 35 U.S.C. 154(b) by 107 days.

(21) Appl. No.: 10/841,442

(22) Filed: May 10, 2004

(65) Prior Publication Data
US 2005/0251682 A1    Nov. 10, 2005

(51) Int. Cl.
*H04L 9/00* (2006.01)

(52) U.S. Cl. ............ 713/176; 713/164; 713/165; 713/167

(58) Field of Classification Search ........ 713/176, 713/164, 167, 200, 201, 165
See application file for complete search history.

(56) References Cited

U.S. PATENT DOCUMENTS

| | | | | |
|---|---|---|---|---|
| 6,659,861 | B1* | 12/2003 | Faris et al. | 463/1 |
| 6,677,858 | B1* | 1/2004 | Faris et al. | 340/573.1 |
| 6,691,229 | B1* | 2/2004 | Nelson | 713/193 |
| 2003/0056102 | A1 | 3/2003 | Aho et al. | |

* cited by examiner

*Primary Examiner*—Thomas R. Peeso
(74) *Attorney, Agent, or Firm*—Mark M. Friedman

(57) ABSTRACT

The present invention is directed to a method for indicating the integrity of a collection of digital objects, such as a software package, an email with attachments, etc.) The method comprising the steps of:

Sealing the collection of digital objects by gathering the hash values of the digital objects into a binding file and digitally signing the binding file (the binding file may further comprise information about the relations between the objects); and Indicating the integrity of a sealed collection of digital objects by validating the integrity of its binding file via its digital signature; and validating the integrity of each object by the correspondence of its hash value with the corresponding hash value stored within the validated binding file.

9 Claims, 3 Drawing Sheets

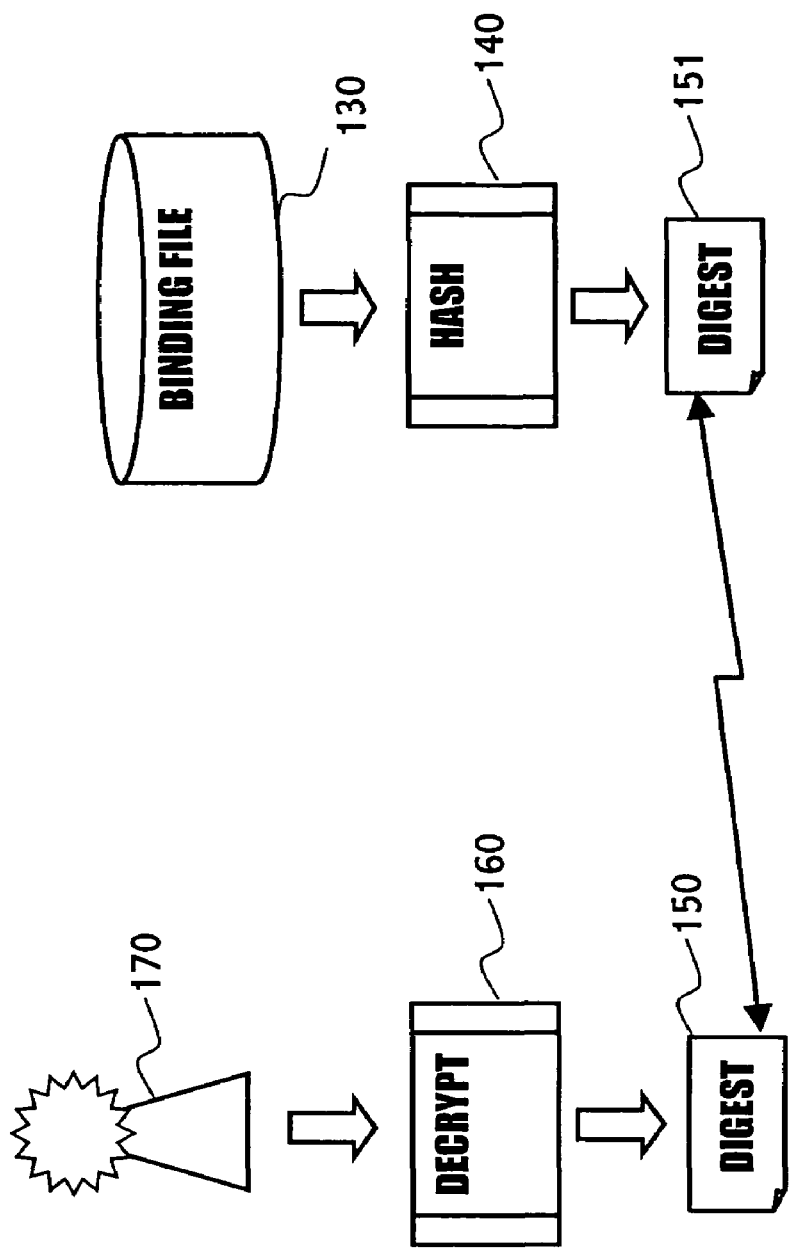

METHOD FOR INDICATING THE INTEGRITY OF A COLLECTION OF DIGITAL OBJECTS

FIELD OF THE INVENTION

The present invention relates to the field of data security. More particularly, the invention relates to a method for indicating the integrity of a collection of digital objects.

BACKGROUND OF THE INVENTION

One of the problems related to data transfer through a common data communication channel, like the Internet, is the exposure of transferred data to hostile objects ("hackers"). In fact, everyone who has access to the Internet may be considered a threat. Consequently, as the number of Internet users increase, so too does the interest in protecting transferred data. As such, the security of data transferred through the Internet has become an issue of interest.

There are two major ways of protecting transferred data: ciphering and integrity validation, i.e. testing that data has not been tampered by an unauthorized object. Integrity validation is normally used when the authenticity of the data is being protected, while ciphering is normally used when the data itself is being protected.

In addition to the traditional Web data that passes through the Internet, such as Web pages and email messages, the Internet has also become a common channel for passing software packages and software updates. A software package usually comprises a collection of files, each of which may be protected by encryption or by digital signatures. The methods currently used in the art may prevent individual files from being tampered with, but they do not refer to protecting a collection of files, or the properties associated with that collection, from tampering, which results with security problems. For example, a software component may be replaced by an earlier version of the same component, in order to bypass restrictions on the use of the whole software package.

It is therefore an object of the present invention to provide a method for indicating the integrity of a collection of digital objects (such as files, email messages, etc.)

It is a further object of the present invention to provide a method for indicating the integrity of a collection of digital objects, in which the collection itself and the information about the relationships between the objects, is protected along with the digital objects themselves.

Other objects and advantages of the invention will become apparent as the description proceeds.

SUMMARY OF THE INVENTION

The present invention is directed to a method for indicating the integrity of a collection of digital objects (e.g. the files of a software package, an email message with attachments, a Web page with its linked URLs, files of a computer folder, and so forth). The method comprising the steps of:

Sealing the collection of digital objects by gathering the hash values of the digital objects into a binding file and digitally signing the binding file (the binding file may further comprise information about the relations between the objects); and Indicating the integrity of a sealed collection of digital objects by validating the integrity of its binding file via its digital signature; and validating the integrity of each object by the correspondence of its hash value with the corresponding hash value stored within the validated binding file.

Also provided, in accordance with an embodiment of the present invention, there a method for associating a digital license with a collection of digital objects (e.g. of a software package, such as executable files, library files, installation files, licensing files, etc.), the method comprising the steps of: sealing the collection of digital objects by gathering the hash values of the digital objects into a binding file and digitally signing the binding file (the binding file may further comprise information about the relations between the objects). Indicating the integrity of a sealed collection of digital objects is carried out by validating the integrity of its binding file via its digital signature; and validating the integrity of each object by the correspondence of its hash value with the corresponding hash value stored within the validated binding file.

BRIEF DESCRIPTION OF THE DRAWINGS

The present invention may be better understood in conjunction with the following figures:

FIGS. 2a, 2b and 2c schematically illustrate the indicating part of a method of indicating the integrity of protected files, according to a preferred embodiment of the invention.

FIG. 2a schematically illustrates the first stage of said indicating part, in which the digest of the binding file is obtained.

FIG. 2b schematically illustrates the second stage of said indicating part, in which the received binding file is validated.

FIG. 2c schematically illustrates the third stage of said indicating part, in which the protected files are validated.

DETAILED DESCRIPTION OF PREFERRED EMBODIMENTS

Hash Function and Document's Digest

Figure 1:
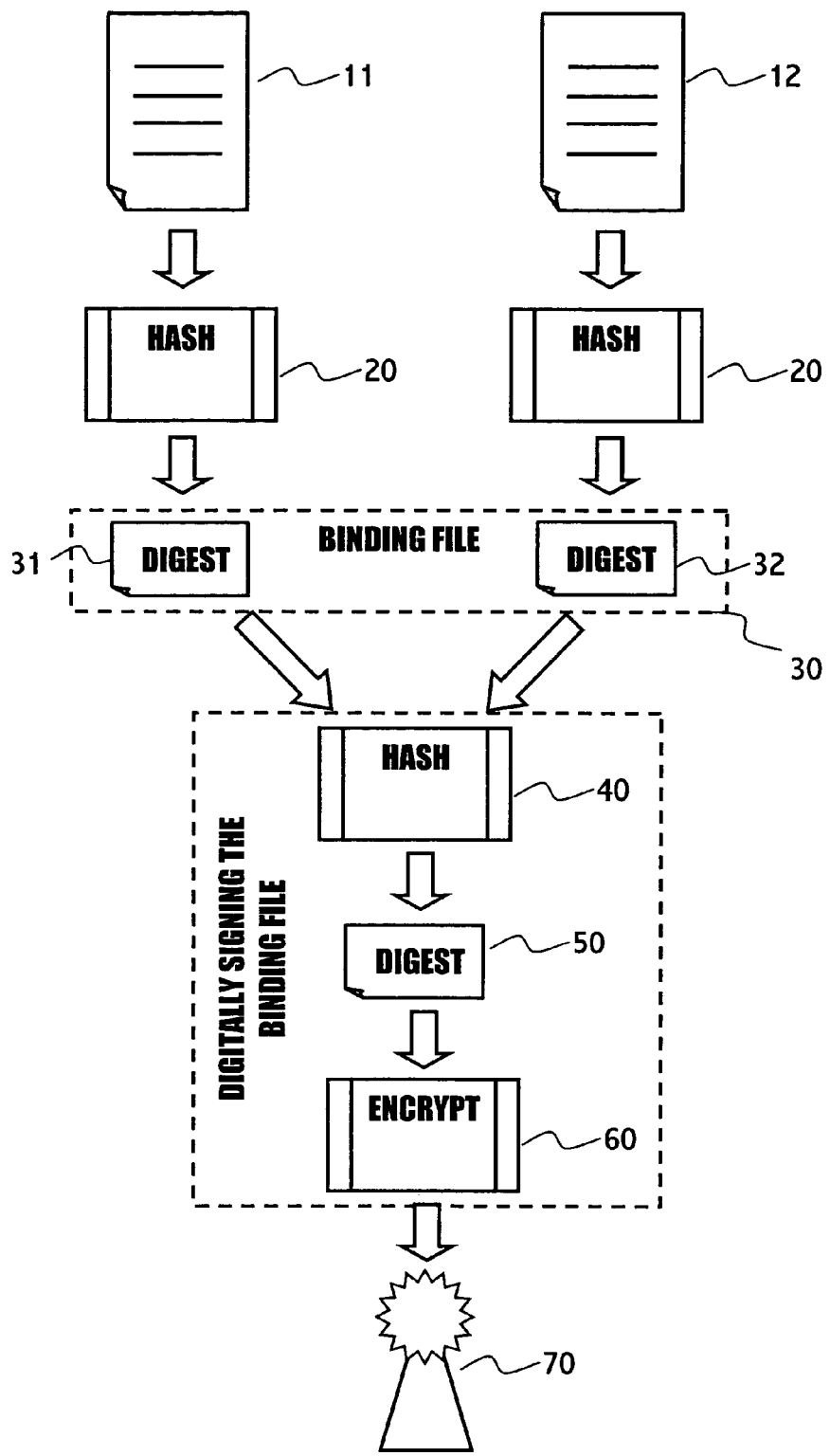
FIG. 1 schematically illustrates the sealing part of a method for indicating the integrity of a collection of files, according to a preferred embodiment of the invention.

A "hash function" is referred in the art as a transformation that takes an input data and returns a fixed-size data (referred to as "hash value", "message-digest", "cryptographic digest" or simply "digest"). When employed in cryptography, hash functions are usually chosen to have some additional properties. For example:

Relatively fast processing time as compared to other cryptographic methods, like encryption.

One-way: Infeasibility to reconstruct the input data from the output data.

Collision-free: Computationally infeasible to produce two messages having the same hash value, i.e. a relatively unique output.

As well as many other examples.

Consequently a hash value of a document can be considered as a digital fingerprint of the document.

Due to the fingerprint nature, upon which it is possible to indicate that a document has not been tampered, one of their common implementations is indicating the integrity of data, especially when the data is conveyed through an open channel, like the Internet. The fact that the message digest of a document is fast as compared to other security methods like ciphering and digitally signing the document, makes it useful. The message digest is small in size and consequently is not a burden on the conveyed data.

MD2, MD5, SH1 and SH2 are examples of well-known hash algorithms.

Digital Signatures

A "digital signature" of a document (and generally of any digital object) is referred in the art as the message digest of the document, where the message digest is encrypted with the private key of the document's originator. By means of digital signatures of conveyed data, a recipient of data can assure that the distributed data has not been tampered. A digital signature of data does not alter the data but merely generates a string to be bundled with the data.

The RSA public-key cipher is a well-known algorithm used for digital signatures. Public-key algorithms are based on a pair of different keys: a "public-key" and a "private-key". The private-key is known only to the originator of the data, while the public key is available to anyone, especially the recipient. If the private-key is used for encryption, the public-key is used for decryption and vice versa. The decryption key cannot be reasonably calculated from the encryption key and vice versa. In a digital signature scheme, the private key generates a signature and the corresponding public key validates it.

The following steps demonstrate a typical digital signature of a document:

At the sender's site:

Generating a digest of the document by a one-way hash algorithm.

Encrypting the document's digest with the private-key of the sender.

Sending the document and its digital signature to the recipient.

At the recipient's site:

Generating a digest of the received document by the same one-way hash algorithm used by the sender.

Decrypting the received encrypted hash value with the sender's public key.

If the received digest matches the digest generated by the recipient, then the signature is valid and the document is intact.

Binding Files

In addition to the traditional information transferred through the Internet, such as Web pages and electronic mail messages, the Internet is a channel for distributing software. For example, a software package may comprise one or more executables (e.g. EXE), library files (e.g. DLL), information files, licensing files, etc. However, a user may purchase a license for using only a part of the features the software enables, e.g. Module1.exe and Module2.exe, with their associated DLL files. In this case, there is an association between Module1.exe and Module2.exe, and also an association between Module1.exe and other files it uses, like DLL files, information files, licensing related files and so forth.

In view of the present invention, a software package is a good example for demonstrating the implementation of the present invention on a collection of files, in contrast to a single file.

Hash function is a very reliable method of creating a unique value that corresponds to an arbitrary stream of bytes. According to one embodiment of the present invention, any digital object, such as an executable file, a data file or an array of bytes in memory, may be associated with any other digital object by computing the hash value of each object, writing the two values in a separate file (referred herein as "binding file") and then digitally signing the binding file. Additional information may be added to a binding file before being digitally signed. Of course, a binding file doesn't necessarily have to be a file, but any container of data. Actually, the important point is the digital signature of the hash values of the digital objects, which technically can be carried out by the means of storing the hash values into a file.

FIG. 1 schematically illustrates the sealing part of a method for indicating the integrity of a collection of files, according to a preferred embodiment of the invention. The protected files, 11 and 12, are hashed with the hash module 20, resulting with message digests 31 and 32 respectively. Digests 31 and 32 are referred to herein collectively as a "binding file" 30. The binding file 30 may comprise additional digital objects, like a file comprising licensing information file, information about the type of association, etc.

Then, digests 31 and 32 (i.e. the binding file 30) are digitally signed as follows: Digests 31 and 32 are hashed by the hash module 40 (which may be identical to the hash module 20), resulting with a digest value 50. The digest value 50 is encrypted with the encryption module 60, resulting with a digital signature 70.

Typically, the protected files 11 and 12 along with the digital signature 70 are delivered to a recipient.

As known to a person of ordinary skill in the art, a "binding file" mechanism may be embodied in a computer's memory, i.e. without being stored on a file at all.

Figure 2C:
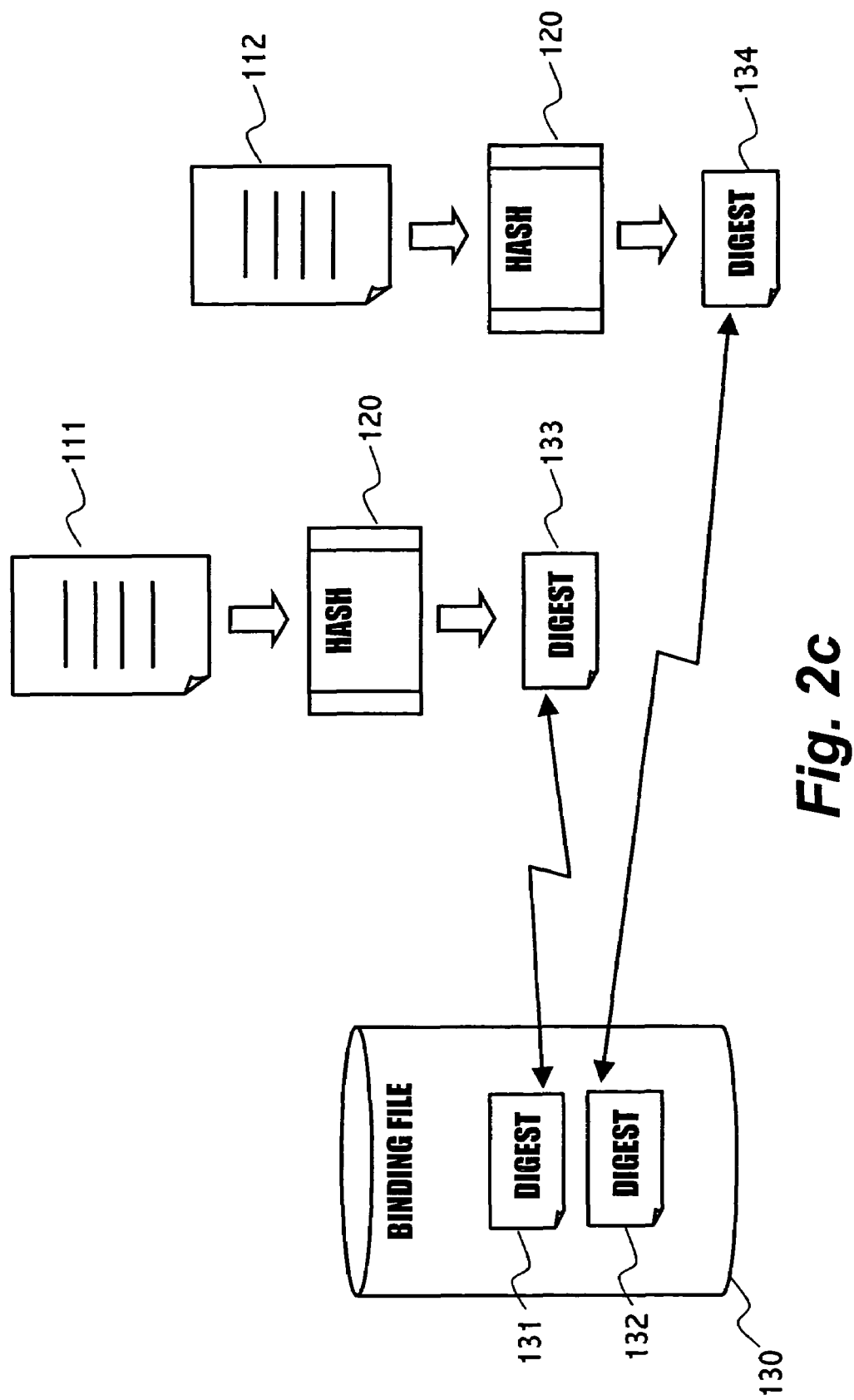

FIGS. 2a, 2b and 2c schematically illustrate the indicating part of a method of indicating the integrity of protected files, according to a preferred embodiment of the invention.

A recipient receives the protected files 111 and 112, which correspond to the sent files 11 and 12 of FIG. 1, a binding file 130 which corresponds to the binding file 30 of FIG. 1, and a digital signature 170 which corresponds to the sent digital signature 70 of FIG. 1. The binding file 130 comprises digests 131 and 132, which correspond respectively to digests 31 and 32 of FIG. 1.

FIG. 2a schematically illustrates the first stage of said indicating part, in which the digest of the binding file is obtained.

The digital signature 70 is decrypted by the decryption module 160 (which corresponds to the encryption module 60 of FIG. 1), resulting with a digest value 150.

FIG. 2b schematically illustrates the second stage of said indicating part, in which the received binding file 130 is validated. The received binding file 130 is hashed by the hashing method 140 (which corresponds to the hashing method 40 used by the sender), resulting with a digest 151. If digest 151 corresponds (e.g. equal) to digest 150, then binding file 130 is validated.

FIG. 2c schematically illustrates the third stage of said indicating part, in which the protected files 111 and 112 are validated. The protected files 111 and 112 are hashed by the hashing method 120 (which corresponds to the hashing method 20 of FIG. 1, resulting with digests 133 and 134 respectively. If the computed digests 133 and 134 correspond to the received digests 131 and 132, then the corresponding files 111 and 112 respectively are validated.

After the validation, the recipient may use the information about the relations between the received files, if it is stored within the binding file. For example, file 111 is an executable and file 112 comprises information about the license terms, e.g. the license period.

It should be noted that not all the protected files have to be hashed, in particular files or data having a smaller size than the size of the hash value.

The present invention has at least the following advantages over the common practice of digitally signing each file (or digital objects) individually:

Any digital object may be hashed, including, for example, files that would be damaged by being signed, email messages, and so forth. Data files that are expected to be in a particular format may normally not be signed without updating all of the executable components that read that format, for example. Also, executable components that are already signed can not be re-signed without invalidating the original signature. Binding files solve both types of problems.

The same digital object may be used with different binding files that may use different key pairs, thereby allowing different associations.

The association between digital objects is not hard-coded into the digital objects themselves. For example, an executable may use the binding file to determine the name of a DLL to load, which may be securely loaded dynamically.

The binding file may contain metadata related to the components or to the association of components—for example, the "type" of association.

The association is not limited to a pairwise association—for example, three or more objects may be associated with one binding file.

The present invention accomplishes the same goal as digitally signing each protected file individually, because if a protected file is modified, the cryptographic digest of the file will also be different and only someone having the corresponding key to the key used to sign the binding file can create a binding file with a different digest but a correct signature.

The present invention is also an improvement over digitally signing each protected file individually, because the files themselves remain unchanged. This allows multiple parties to use their own public/private key pairs to make their own binding files, all of which prevent the original file from being tampered with, even by another of the original signers. It also prevents problems that may occur when the file itself is modified to append the signature—it permits any file format to be protected.

From another point of view, the present invention also achieves an improvement over signing each protected file individually, because it is an indication that not only have the files themselves been approved by the signing entity, but the specific collection of files has been approved as well. This prevents, for example, a situation where someone may attempt to use an older component with a newer application, even if the older component is legitimate and individually signed.

Binding files are an ideal way to securely tie an arbitrary number of executable components and data components together, because the components can be updated individually, at any time, along with the corresponding binding file, with no loss of security.

One use of binding files is to associate a digital license with an executable, and to associate one or more executable licensing components with a digital license. This allows the same executable component to be used with different licenses and different license management logic. It also allows licenses to be upgraded independently of the licensed software, such as for rentals or license upgrades.

Binding files can also be used to associate other files in a way that prevents them from being tampered with, by including "properties" about that association. For example, they can include information about the type of association and can contain any sort of metadata about the desired association. One form of metadata that may be used, for example, is a "license expression" which says that "this component can be used with License A or License B" and so forth. Since binding files are digitally signed, the metadata about the association is also secure.

It should be noted that the encryption can be carried out either, by symmetric encryption methods, such as AES, DES, RC5, RC4 etc., as well as asymmetric encryption methods, such as RSA, Elliptic Curve Cryptography, El Gamal, DSA, etc.

In addition to embodying the present invention on a software package, it should be noted that the present invention may be embodied in a variety of fields and applications. For example, collection of a credit card number and its expiration date may be hashed and associated with the hash of the name and billing address of the owner and the current date. This could be used to allow anonymous Internet credit card purchases, since rather than sending a credit card and address information, the user is simply proving that he knows all of the correct information. By including the current date in one of the hashes, he prevents the possibility of the two hashes being captured and re-used.

According to another example, the invention may be used for determining the integrity of files within a computer folder. According to the methods used currently in the art, the files of a folder are scanned, and their CRC (Cyclic Redundancy Checks) value is stored within the folder. In contrary to the prior art, according to the present invention hash values replace the CRC values, and the hash values of each folder are digitally signed as being a single file. This method is much more secure than the method used in the art, since hash function is more secure than CRC methods. Moreover, the additional information added to a folder (upon which the indication of file tampering is carried out) is negligible in comparable to the methods used in the art.

Those skilled in the art will appreciate that the invention can be embodied by other forms and ways, without losing the scope of the invention. The embodiments described herein should be considered as illustrative and not restrictive.

In particularly, it should be noted that despite the fact that the description and examples herein are directed to files, this form of data objects is merely an example, and the present invention may be embodied to different forms of digital objects, like email messages, or any form of data. Also it should be noted that the invention is directed to data passed through a communication channel as well as to data passed through another media, like a disk delivered by mail or messenger.

Moreover, the invention may also be implemented to "static" data, e.g. for checking the integrity of files on a user's computer, in order to detect tampering by a hostile code, like computer virus, as well as to conveyed data.

The invention claimed is:

1. A method for indicating the integrity of a collection of digital objects, the method comprising the steps of:
    sealing said collection of digital objects by:
        computing a hash value of each object of said collection;
        gathering the computed hash values into a binding file; and
        digitally signing said binding file; and
    indicating the integrity of the sealed collection of digital objects having a coresponding binding file by:

validating the integrity of said binding file by its digital signature, computing a hash value of each object of said sealed collection of digital objects, and validating the integrity of each object of said sealed collection of digital objects by verifying a correspondence of its hash value with the corresponding hash value stored within the validated binding file.

2. A method according to claim 1, wherein said gathering further comprises including at least one additional digital object in the binding file.

3. A method according to claim 2, wherein said additional digital object comprises information with relevance to said collection of digital objects.

4. A method according to claim 1, wherein said collection of digital objects is selected from a group comprising: a software package, an email message, a computer folder, and a Web page.

5. A method for associating a digital license with an executable, the method comprising the steps of:

computing a respective hash value of the digital license and the executable;

gathering the computed hash values into a binding file;

digitally signing said binding file; and indicating the integrity of the association of the digital license with the executable by:

validating the integrity of said binding file by its digital signature, computing a hash value of the digital license and a hash value of the executable;

validating the integrity of the digital license by verifying a correspondence of its hash value with the corresponding hash value stored within the validated binding file; and validating the integrity of the executable by verifying a correspondence of its hash value with the corresponding hash value stored within the validated binding file.

6. A method of indicating the integrity of a number of a credit card, comprising the steps of:

computing a hash value of a first digital object that includes the number of the credit card and an expiration date of the credit card;

computing a hash value of a second digital object that includes a name of an owner of the credit card, a billing address of said owner and a current date;

gathering said computed hash values into a binding file; and digitally signing said binding file.

7. A method of indicating the integrity of files in a computer folder, comprising the steps of:

computing a respective hash value of each file;

gathering said computed hash values into a binding file;

digitally signing said binding file;and indicating the integrity of the files in the computer folder by:

validating the integrity of said binding file by its digital signature;

computing a hash value of each file in the computer folder; and validating the integrity of each file in the computer folder by validating a correspondence of its hash value with the corresponding hash value stored within the validated binding file.

8. A method for indicating the integrity of a collection of digital objects, the method comprising the steps of:

sealing said collection of digital objects by:

computing a hash value of each object of said collection;

gathering the computed hash values into a binding file; and digitally signing said binding file;

wherein said gathering further comprises including at least one additional digital object in the binding file;

wherein said additional digital object comprises information with relevance to said collection of digital objects;

and wherein said information is selected from the group comprising: information related to a type of one or more members of said collection of digital objects, an association between at least two members of said collection of digital objects, a license expression of at least one member of said collection of digital objects, signors of a contract, time related information.

9. A method for indicating the integrity of a collection of digital objects, the method comprising the steps of:

sealing said collection of digital objects by:

computing a hash value of each object of said collection;

gathering the computed hash values into a binding file; and digitally signing said binding file;

wherein said sealing includes including metadata about the objects of said collection in said binding file before said digital signing of said binding file.

* * * * *